T. HENRI.
COMBINED LEVEL AND GRADE FINDER.
APPLICATION FILED JULY 17, 1920.
1,404,393.
Patented Jan. 24, 1922.
Fig. 1.
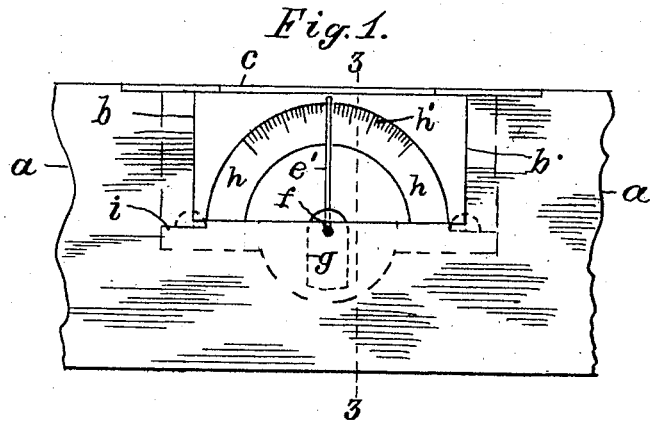
Fig. 2.
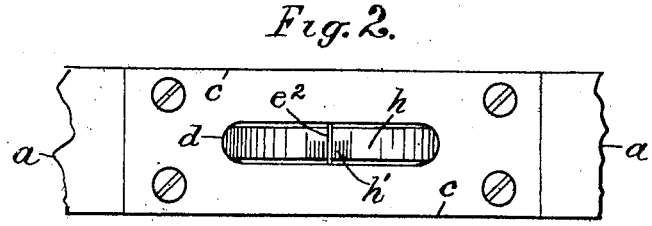
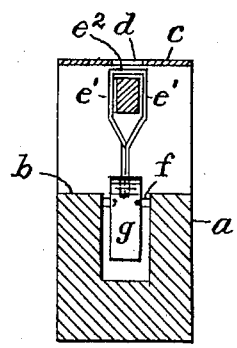
Fig. 3.
INVENTOR
Theodore Henri.
BY
P. W. Boesen
ATTORNEY

UNITED STATES PATENT OFFICE.

THEODORE HENRI, OF NEW YORK, N. Y.

COMBINED LEVEL AND GRADE FINDER.

1,404,393.

Specification of Letters Patent. Patented Jan. 24, 1922.

Application filed July 17, 1920. Serial No. 397,037.

*To all whom it may concern:*

Be it known that I, THEODORE HENRI, a subject of the King of Denmark, residing at 120 East 123 Street, New York, county of New York, and State of New York, have invented certain new and useful Improvements in Combined Level and Grade Finders, fully described and represented in the following specification and the accompanying drawings, forming a part of the same.

This invention relates to a level and grade-finder in which the index is actuated by gravity; and the object of the invention is to locate the indicating mechanism in a notch in the upper side of a mason's level so as to be wholly covered by a plate on that side and thus protected from injury; and the indicating mechanism is constructed with three scales which are visible respectively from the two sides and the top of the level.

In the drawing, Fig. 1 is an elevation of the middle portion of a mason's level to which the improvement is applied; Fig. 2 is a plan of the same; and Fig. 3 is a section of the same on line 3—3 in Fig. 1.

$a$ designates the body or stock of the level having a rectangular notch $b$ formed in its upper half, the outer side of the notch being covered by an index-plate $c$ having a slot $d$ to expose the position of the index to view.

A flat-sided half-ring $h$, to carry the indicating scales, has feet $i$ secured by screws in the bottom of the notch, the arch of the ring extending nearly to the top-plate $c$. This arch has a cylindrical outer edge, and carries three scales as hereinafter described.

The index consists of a double arm $e'$ hung upon a pivot $f$ at the axial line of the arch, and held in a vertical position by a weighted hub $g$.

The arms of the index extend radially past the opposite flat sides of the arch, and are connected by a cross-piece $e^2$ made in one piece therewith.

In Fig. 2 a scale $h'$ is shown drawn upon the top of the arch for use with the cross-bar, and each of the flat sides of the arch is provided with a similar scale for use respectively with each of the arms $e'$. The scales are used in indicating grades of various degrees, and a level is indicated by the center mark of the scale as is common in such levels.

The novelty of the present construction consists in the employment of a half-ring to carry three scales, and index-arms mounted upon a pivot inside of the ring and extended radially past both of the flat sides of the ring and connected by a cross-bar adjacent to the outer edge of the ring.

The cross-bar and two arms are made of one piece of wire, and the two ends of the wire are attached to the hub $g$, thus forming a very cheap construction.

This compound index-arm thus has three index-members which are held by gravity adjacent to the flat sides and the edge of the ring.

The slot $d$ in the top-plate $c$ permits inspection of the cross-bar and its relation to the scale upon the edge of the arch, and the opening of the notch $b$ at both flat sides of the ring exposes the scales thereon to the view of the operator, and the index of the device is thus visible from whatever quarter the notch $b$ is viewed.

Such visibility arises from the construction of the two index-arms, which pass each side of the arch and have the cross-bar extending across the outer side of the arch.

Having thus set forth the nature of the invention what is claimed herein is:

1. In a level having an index-arm operated by gravity, the combination, with a stock having a rectangular notch in one side and a slotted index-plate upon the outer side of such notch, of a half-ring secured in the bottom of the notch and its arch extended nearly to the slot of the index-plate, said arch having flat sides and a cylindrical outer edge, index-arms having a pivot located in the axial line of the arch and the arms connected by a cross-piece extending across the outer edge of the arch, and scales upon such flat sides and outer edge of the arch, to co-operate with the three indices.

2. In a level having an index-arm operated by gravity, the combination, with a stock having a rectangular notch in one side and a slotted index-plate upon the outer side of such notch, of a half-ring having feet secured in the bottom of the notch and its arch extended nearly to the slot of the index-plate, said arch having flat sides and a cylindrical outer edge, an index having a pivot located in the axial line of the arch and made of one piece of wire bent to form two arms extended radially past the opposite flat sides of the arch and connected by an integral cross-piece adjacent the outer edge of the arch, and the two ends of the wire being attached to the hub.

In testimony whereof I have hereunto set my hand.

THEODORE HENRI.